United States Patent [19]

Olson et al.

[11] Patent Number: 5,067,406

[45] Date of Patent: Nov. 26, 1991

[54] SUPERSONIC, LOW-DRAG, SOLID FUEL RAMJET TUBULAR PROJECTILE

[75] Inventors: Donald N. Olson, Lutherville; Joseph Huerta, Aberdeen, both of Md.

[73] Assignee: The United States of America as represented by the Secretary of the Army, Washington, D.C.

[21] Appl. No.: 608,915

[22] Filed: Nov. 5, 1990

[51] Int. Cl.⁵ .................. F42B 10/34; F42B 15/10
[52] U.S. Cl. ............................ 102/374; 60/262; 60/270.1; 102/503
[58] Field of Search .............. 60/270.1, 251, 262, 60/263; 102/374, 376, 380, 503

[56] References Cited

U.S. PATENT DOCUMENTS

| | | |
|---|---|---|
| 2,989,922 | 6/1961 | Greenwood et al. ............ 102/380 |
| 3,340,690 | 9/1967 | Norman et al. ................. 60/270.1 |
| 4,301,736 | 11/1981 | Flatau et al. ................... 102/503 |
| 4,502,649 | 3/1985 | Botwin et al. ................. 60/270.1 |
| 4,539,911 | 9/1985 | Flatau ........................... 102/374 |
| 4,796,534 | 1/1989 | Mikhal .......................... 102/374 |
| 4,936,218 | 6/1990 | Wasenitz ....................... 102/503 |

FOREIGN PATENT DOCUMENTS 1036205 9/1953 France ........................... 102/374

Primary Examiner—Harold J. Tudor
Attorney, Agent, or Firm—Anthony T. Lane; Edward Goldberg; Michael C. Sachs

[57] ABSTRACT

A low-drag supersonic tubular projectile with self-contained thrust augmentation and capable of simultaneous dual internal air flows. One is a centrally located supersonic flow for providing low-drag characteristics, and the other a subsonic flow annularly arranged about the supersonic flow path, comprising a ramjet structure with solid fuel for deriving thrust augmentation enabling the projectile to achieve a terminal velocity which is substantially the same as or exceeding muzzle velocity.

4 Claims, 1 Drawing Sheet

5,067,406

SUPERSONIC, LOW-DRAG, SOLID FUEL RAMJET TUBULAR PROJECTILE

GOVERNMENT INTEREST

The invention described herein may be manufactured, used and licensed by or for the United States Government without the payment of royalties thereon.

BACKGROUND OF THE INVENTION

The present invention relates to tubular projectiles used in weaponry, and more particularly to supersonic, low-drag tubular projectiles possessing solid fuel ramjet thrust augmentation.

The concept of supersonic, low-drag tubular projectiles used in weaponry is known from U.S. Pat. No. 4,301,736 to Flatau and Huerta. Well described therein are the problems to be overcome in providing on the one hand a low-drag tubular kinetic energy projectile with flight performance based upon the initial muzzle velocity, and maintaining sufficient mass on the other hand for providing adequate terminal momentum and thus destructive force upon impact. As described therein, the difficulty in providing an acceptable balance between the potentially conflicting parameters of velocity, mass, aerodynamic characteristics and payload capacity, make this a highly empirical science. The aforementioned discussion contained in the U.S. Pat. No. 4,301,736, insofar as the same bears direct relevance to the subject matter of the present invention, is incorporated herein by reference.

For over a decade, technologists have sought to successfully develop a solid fuel ramjet tubular projectile capable of sustaining the muzzle velocity in flight. The general concept of a solid fuel ramjet-type thrust augmentation arrangement in tubular projectiles is known from U.S. patent application Ser. No. 514,113, filed July 15, 1983, to Olson, Huerta and Holzman, now abandoned. This hollow projectile provides a centralized tubular design with an internal mid section constituting a combustion chamber annularly lined with solid fuel for effecting thrust augmentation. The rear portion of the projectile is provided with a thrust generating design comprising a constriction portion and a flared rear section, which operate on the hot expanding gases generated in the mid section combustion chamber in well known manner. This arrangement combines the design of a supersonic, low-drag tubular projectile with an internally arranged auto-ignited, solid fuel thrust augmentation system.

With regard to thrust augmentation such as described above, it is known that to effect auto-ignition and a sustained burn, the air flow through the combustion chamber should be subsonic. Moreover, to provide an even burn of the solid fuel and thereby optimize burn efficiency and projectile stability, the combustion chamber should be relatively narrow in cross-sectional dimension. However, a constricting combustion chamber directly opposes the ability to maintain the projectile at supersonic speed, let alone at or better than muzzle velocity. It is also true that one cannot simultaneously effectively provide both supersonic and subsonic air flow through the single-path tubular interior.

What is needed is a tubular projectile which captures the advantageous characteristics of low drag, supersonic internal flow, adequate mass and acceptable aerodynamic design on the one hand, and a self-igniting, efficient solid fuel thrust augmented projectile which can achieve a terminal velocity that equals or exceeds muzzle velocity, on the other hand, and which effectively overcomes the inherent conflicts in the above-discussed design parameters and characteristics.

SUMMARY OF THE INVENTION

The tubular projectile of the present invention solves these conflicts while achieving the desired velocity end result and maintaining the aforementioned parameters and characteristics.

According to the invention, there is provided a tubular projectile having first and second annularly arranged flow paths, the first providing supersonic, low-drag flow-through characteristics for the projectile over all, and the second providing simultaneously with the generation of the first path flow characteristics a subsonic flow with self-igniting solid fuel thrust augmentation.

In accordance with the preferred embodiment of the present invention, the supersonic flow path is centrally located along the longitudinal axis of the projectile. Annularly arranged relative thereto is the second or subsonic flow path, which contains the solid fuel in a relatively very narrow cross-sectioned combustion chamber, positioned in the middle portion of the projectile, and a thrust-providing aft section. This invention incorporates a internally-located second inlet which ingests air from the supersonic flow near the internal wall and then directs it through a rearward-facing step into the fuel-lined combustion chamber where fuel ignition occurs. The products of combustion along with the remaining air are accelerated to supersonic velocities through a nozzle at the base of the projectile to produce thrust.

Combustion efficiency is optimized because of the narrow passageway in the combustion region which allows the flame to maintain a high temperature profile from wall to wall. At burnout, the projectile would still retain the low-drag characteristics due to the internal geometry associated with the primary flow path.

BRIEF DESCRIPTION OF THE DRAWINGS

The invention will become better understood by reference to the accompanying drawings, taken in conjunction with the detailed description to follow, in which.

DETAILED DESCRIPTION OF THE PREFERRED EMBODIMENT(S)

Figure 1:
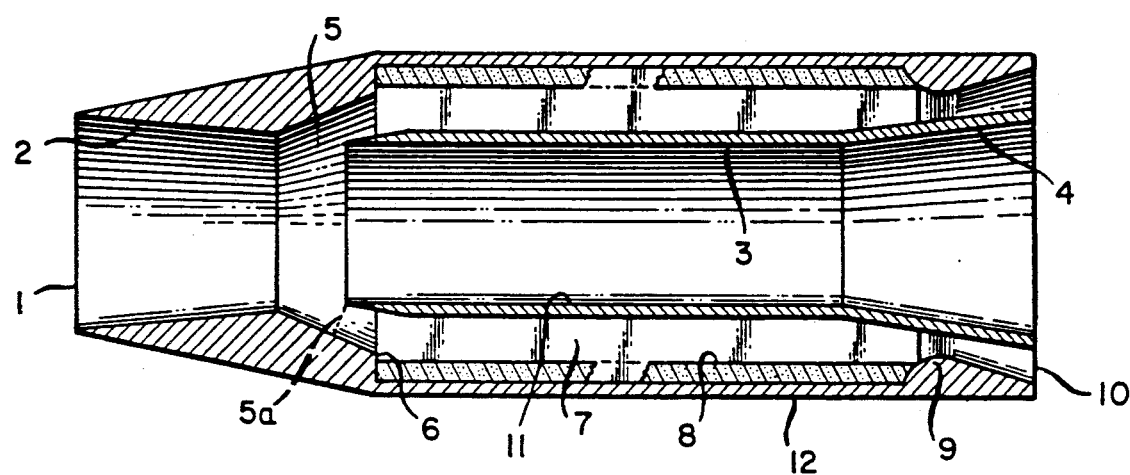
FIG. 1 is a cross-sectional view of the novel tubular projectile taken along its longitudinal center axis.

Referring to the Figures, the tubular projectile with thrust augmentation, according to the invention, is shown in longitudinal section in FIG. 1. The projectile is generally defined by outer casing 12. The hollow interior of the projectile extends from primary inlet 1, through a contraction section 2, a constant diameter section 3, and an expansion section 4. The sections 1-4, properly designed in a manner known to the art and in compliance with the general requirements described in the aforementioned U.S. Pat. No. 4,301,736, assure supersonic flow through the projectile at its design Mach number range and provides the lowest possible aerodynamic drag.

An annular internal inlet section 5, positioned between the contraction portion 2 of primary inlet section 1 and the constant diameter section 3, enables some of the air of the supersonic flow in contraction portion 2 to be directed or diverted through annular throat 5a and injector 6 into an annular combustion chamber 7. Chamber 7 is defined by inner wall 11 which is generally concentric with outer casing 12.

Throat 5a is formed by the circular fore end of constant diameter section 3 and the angled interior wall of outer casing 12. Annular injector 6 constitutes a rearward facing step, which by its defined sudden increase in the diameter of the air passage, generates a localized clockwise (when viewing the projectile as in FIG. 1) circulation of the air immediately aft of the step. Step 6 acts to retain the flame of combustion aft of the step, like a flame holder in jets. It also eases the start of combustion.

Annular combustion chamber 7 is lined with solid fuel 8, which may be of any suitable composition such as rubber, plexiglass, or other composition not ordinarily flammable at room temperature and atmospheric pressure. For a more complete discussion of suitable fuels and their characteristics, refer to the aforementioned U.S. patent application, Ser. No. 514,113.

The fuel 8 is burned by the hot air entering chamber 7 through inlet 5 and specifically throat 5a. The products of combustion and air pass through nozzle 9 and are in known manner accelerated to supersonic velocity at the base 10 of the projectile, thus providing augmenting thrust in flight.

The air entering secondary inlet 5 is rapidly decelerated to subsonic flow by the time it arrives in combustion chamber 7. The rapid deceleration produces sufficiently high temperature and pressure to effect autoignition of the fuel 8, in well known manner.

The ratio of the annular areas of the inlet 5, injector 6, combustion chamber 7, the throat of nozzle 9 and nozzle exit 10, required say for ramjet operation are already well known, as are the internal dimensions of the tubular projectile through which the air flow remains supersonics in flight. For example, adequate compression to provide effective ramjet type thrust is achieved via the area of throat 5a being not less than 0.6 of the primary inlet 1, and the distance between these two areas being not less than the diameter of primary inlet 1.

Figure 2:
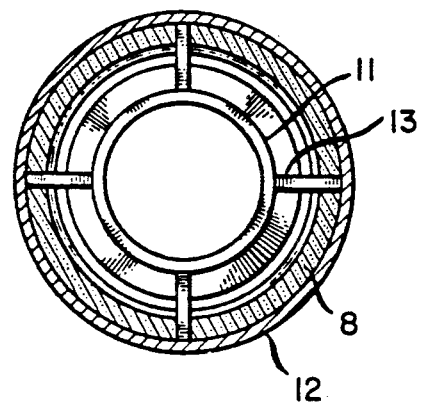
FIG. 2 is a cross-sectional view of said projectile taken perpendicular to its longitudinal axis through the mid section or combustion chamber thereof.

Referring to FIG. 2, the ramjet portion of the projectile is defined by the wall 11 of the supersonic flow path and the outer casing 12. Wall 11 and casing 12 are fixedly connected by strut-like structures 13.

The casing 12 typically would be of hardened steel, such as a Rockwell hardness C scale 45 to 55. Nozzle 9 may be composed of a heat-resistant carbon-based composition material or hardened steel like casing 12. The constant diameter section 3 may be a firm stainless steel tube, with the struts 13 being of the same material.

Preferred dimensional considerations for the projectile and its combustion chamber would be for the overall length thereof to be 3.5 to 7 times the outer diameter of the shell (the so-called L/D ratio), and the secondary passageway especially in the combustion chamber region being approximately one quarter of the outer shell diameter.

The inventive concept of a low drag supersonic tubular projectile effectively embodying a concentrically-arranged ramjet structure is accomplished by an internally arranged secondary inlet which taps the central supersonic flow to initiate a subsonic air flow to the annular ramjet structure. This design is fully applicable to both spin stabilized and fin stabilized projectiles.

There has thus been described in the foregoing a tubular projectile capable of simultaneous dual internal air flows, one a centrally located supersonic flow for providing low-drag, supersonic velocity-maintaining characteristics, and the other a subsonic flow annularly arranged about the supersonic flow path, comprising a ramjet structure with solid fuel for deriving thrust augmentation enabling the projectile to achieve a terminal

What is claimed is:

1. A supersonic projectile comprising an essentially tubular body having a forward end and an aft end, including an essentially cylindrical tubular member having a forward constant diameter section and a rearward expansion section which extends to the aft end of the tubular body mounted axially in said tubular body, said tubular member having an axial through bore therein, and open-ended, means for supporting said tubular member within said tubular body such that an annular hollow cylindrical passageway is formed between the tubular member's outside perimeter and the inside surface of said tubular body, said annular passageway, coaxial with said through bore, said tubular body further comprising a first means for diverting portions of air flow passing through said through bore when the projectile is in flight into said annular passageway, such air flow portions in said annular passageway being subsonic when the air flow passing through said through bore is supersonic, and a nozzle means in said tubular body for permitting exit of gas flows from said annular passageway and accelerating said gas flows out the aft end of the said projectile at supersonic speeds, said annular passageway containing a self igniting lining of solid fuel propellant lining an inner wall of the tubular body, whereby said propellant is ignited by the air flow portions in said annular passageway when said projectile is launched at supersonic velocities, such accelerated gas flows exiting the nozzle means providing thrust to said projectile, such thrust augmenting the velocity of the projectile.

2. The projectile of claim 1 wherein the said thrust augments the velocity of the projectile to exceed the projectile's launch velocity.

3. The projectile of claim 1 wherein the said propellant is rubber material.

4. The projectile of claim 1 wherein said first means comprises an annular injector means which includes a rearward facing step, said step aiding in the start of propellant combustion and also in flame retention.

* * * * *